May 3, 1955  C. A. BONVILLIAN ET AL  2,707,493

CONDUITS

Original Filed March 13, 1943

Inventors
CLAUDE A. BONVILLIAN
RALPH C. BRIERLY
SAMUEL LETVIN

By A. H. Helmstin
Attorney

United States Patent Office 2,707,493
Patented May 3, 1955

2,707,493

CONDUITS

Claude A. Bonvillian, Chattanooga, Tenn., Ralph C. Brierly, Narberth, Pa., and Samuel Letvin, Elmhurst, N. Y.

Original application March 13, 1943, Serial No. 479,010. Divided and this application December 1, 1949, Serial No. 130,571

1 Claim. (Cl. 138—63)

(Granted under Title 35, U. S. Code (1952), sec. 266)

This invention relates to conduits or pipe lines.

The invention provides a new and useful conduit for conducting high temperature gases and other heated fluids from their point of generation or heating to their point of use or disposition or for conducting them from point to point.

Figure 1:
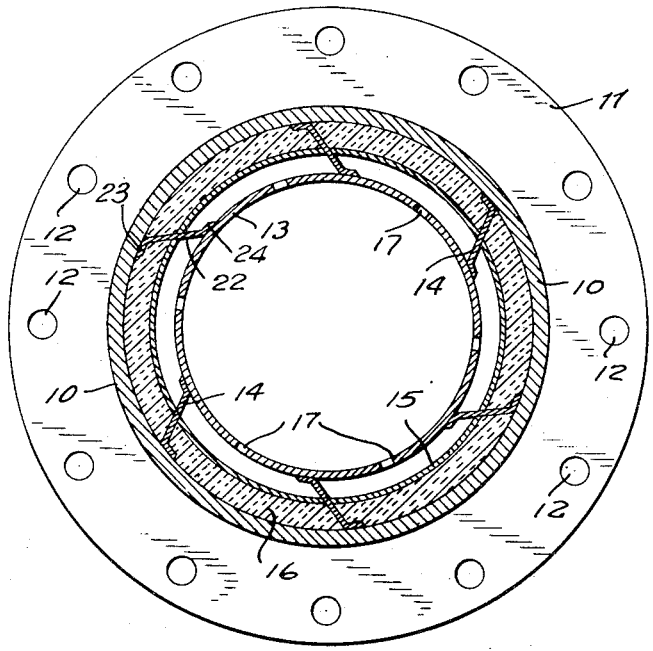
Figure 2:
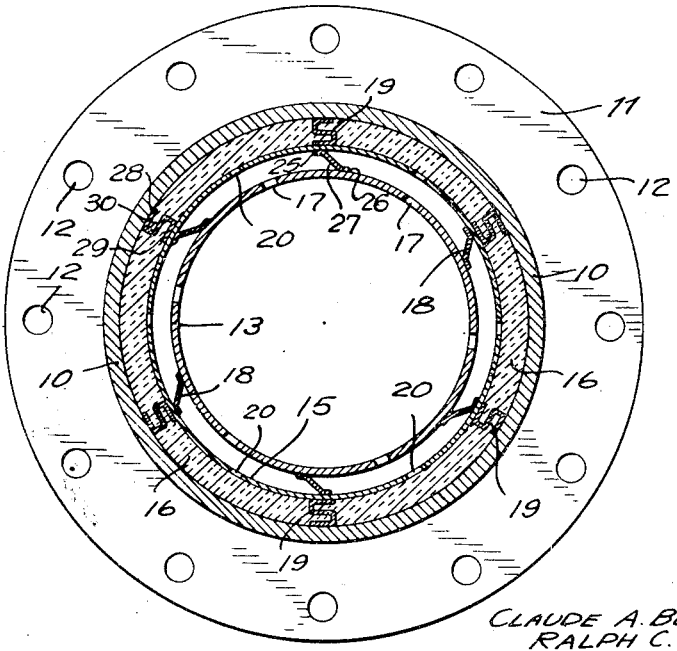

The invention will be understood from the following description when considered in connection with the accompanying drawing forming a part thereof, and in which:

Fig. 1 is a sectional view taken transversely of the axis of a conduit embodying the invention, and Fig. 2 is a similar view illustrating another form of the invention.

Like characters of reference refer to the same parts in the two views.

This application is a division of our copending application Serial No. 479,010 filed March 13, 1943, now Patent No. 2,500,925.

Referring to Fig. 1 of the drawing, reference character 10 designates the cylindrical portion of a section of pipe of ordinary steel. Each end of the pipe section 10 is provided with an annular flange 11 having bolt holes 12 through which bolts are passed to secure adjacent pipe sections together.

Within the cylindrical portion 10 and disposed coaxially therewith is a relatively thin, high temperature resistant alloy liner 13 which is supported in position by a plurality of generally Z-shaped spacing and supporting members 14 which extend for the full length of the pipe section 10 and are secured by welding or otherwise to the liner 13 and rest against the inner cylindrical wall section 10 although they may, if desired, rest against the inner surface of the liner 15 described hereinafter. The Z-shaped spacing and supporting members 14 comprise flanges or head portions 23 and 24 bearing against the pipe section 10 and the inner liner 13 united by web portions 22 which are non-radial, that is to say inclined to the radii of the conduit intersecting such webs.

Approximately midway between the section 10 and the liner 13, is an intermediate liner 15 which has a relatively high heat reflecting characteristic. The liner 15, as shown, is made in a plurality of arcuate sections, each of which spans the space between adjacent Z-shaped members 14 and is attached to these members by suitable means such as tack welding or bolting. High temperature insulation 16 is disposed between the inner wall of section 10 and the outer wall of the intermediate liner 15. The inner liner 13 is provided with a plurality of aperatures 17 to permit rapid equalization of gas pressure throughout the piping in conjunction with the spaces between the Z-shaped members 14 and the sections of the liner 15.

The form of the invention illustrated in Fig. 2 is like the form previously described, excepting for the spacing and supporting members for the liners 13 and 15. In Fig. 2, longitudinally extending Z-shaped spacing and supporting members 18 are welded or otherwise secured to the liner 13 and rest against the inner wall of the intermediate liner 15 the spacing and supporting members 18 include head or flange portions 25 and 26 bearing against the intermediate and inner liners respectively, and web portions 27 inclined to radii of the conduit intersecting such web portions. S-shaped spacing and supporting members 19 are attached by welding or otherwise to the intermediate liner 15 and rest against the inner wall of the pipe section 10. Suitable apertures 20 are provided in the intermediate liner 15 to provide for the equalization of gas pressure. The spacing and supporting members 19 include flange or head portions 28 and 29 bearing against the outer pipe section and intermediate liner 12 and joined by a non-radial web portion 30 which is at an angle to radii of the conduit intersecting the same.

It will be observed that the Z-shaped spacing and supporting members which support the inner liner have webs which are nonradial, thereby permitting them to yield so as to permit free uniform expansion and contraction of the liner in radial directions. These Z-shaped members thus constitute in effect yielding or spring struts located at intervals around the circumference of the inner liner. Preferably also the Z-shaped struts are mounted upon and welded to the surface of one of the tubular members, preferably the outer surface of the inner liner, and are not secured at their other ends to the surface against which they bear. Thus the struts permit free longitudinal expansion and contraction of the inner liner with respect to the adjacent member, as well as free radial expansion and contraction.

By utilizing the invention, high temperature gases under high pressure can be conducted from point to point with safety and without damage to the piping 10, since it is thoroughly protected from the effects of the high temperature which is confined to the area within liner 13 and this liner is free to expand and contract with changes in temperature. Owing to the fact that the pressure is equalized between the inside and the outside of the liner, the latter is not required to withstand any internal pressure. Accordingly it may be made of a relatively light gauge metal which is of such a nature as not to be adversely affected even if heated to high temperatures such as a red heat. The piping 10, on the other hand need not be made of such high heat resistant alloy and as it is protected from extreme temperatures it will retain its normal strength to resist the pressure within it. The intermediate liner, if used, acts as a means to reflect the heat, thereby reducing the amount of heat reaching the pipe 10, and it also acts to retain the insulating material 16 in position. In conjunction with the liner 17 it provides an air space which limits direct conduction of heat and permits the heat reflecting properties of intermediate liner to be effective.

The invention disclosed herein may be manufactured and used by or for the Government of the United States for government purposes without the payment of any royalty thereon.

It will be understood that preferred forms of the invention have been illustrated and described and that changes in the form, location and relative arrangement of the several parts of the conduits disclosed may be made without departing from the principles of the invention. Accordingly, the invention is not to be limited excepting by the scope of the appended claim.

What is claimed is:

A fluid conduit construction which is subjected to expansile and contractile strains comprising a rigid outer imperforate tubular member and a rigid inner perforate tubular member providing a fluid passageway, a plurality of resilient struts spaced circumferentially of and between the tubular members to provide an annular space between adjacent walls of said members, said resilient struts being in contact with said adjacent walls and secured to at least one of said walls to provide for relative movement between the tubular members, partitioning means extending generally axially of said annular space and dividing the space into an outer annular zone for receiving insulation material and an inner annular fluid zone which is in communication with said fluid passageway through perforations in the inner tubular member.

References Cited in the file of this patent

UNITED STATES PATENTS

| | | |
|---|---|---|
| 268,860 | Browell | Dec. 12, 1882 |
| 340,073 | Ainsworth | Apr. 20, 1886 |
| 459,035 | Costigan | Sept. 8, 1891 |
| 1,714,948 | Coffin | May 28, 1929 |
| 1,757,479 | Schmidt et al. | May 6, 1930 |
| 1,930,285 | Robinson | Oct. 10, 1933 |
| 2,231,982 | Zalkind | Feb. 18, 1941 |
| 2,348,754 | Ray | May 16, 1944 |
| 2,410,308 | Scharwath | Oct. 29, 1946 |
| 2,468,902 | Villiger | May 3, 1949 |

FOREIGN PATENTS

| | | |
|---|---|---|
| 221,376 | Switzerland | Aug. 17, 1942 |
| 488,913 | Great Britain | July 15, 1938 |
| 535,491 | Great Britain | Apr. 10, 1941 |
| 555,176 | Great Britain | Aug. 9, 1942 |